(12) United States Patent
Doe et al.

(10) Patent No.: US 12,544,495 B2
(45) Date of Patent: Feb. 10, 2026

(54) ADDITIVE PNEUMATIC MANIFOLD

(71) Applicants: BAXTER INTERNATIONAL INC., Deerfield, IL (US); BAXTER HEALTHCARE SA, Glattpark (CH)

(72) Inventors: Richard Anderson Doe, Gurnee, IL (US); Scott M. Wentz, Grayslake, IL (US); John Joseph Clohessy, Crystal Lake, IL (US); Luis Ernesto Criales Escobar, Grayslake, IL (US); Donald Smith, Trevor, WI (US)

(73) Assignees: BAXTER INTERNATIONAL INC., Deerfield, IL (US); BAXTER HEALTHCARE SA, Glattpark (CH)

( * ) Notice: Subject to any disclaimer, the term of this patent is extended or adjusted under 35 U.S.C. 154(b) by 643 days.

(21) Appl. No.: 17/480,969

(22) Filed: Sep. 21, 2021

(65) Prior Publication Data
US 2022/0118163 A1    Apr. 21, 2022

Related U.S. Application Data

(60) Provisional application No. 63/094,629, filed on Oct. 21, 2020.

(51) Int. Cl.
*A61M 1/28* (2006.01)
*A61M 39/10* (2006.01)
(Continued)

(52) U.S. Cl.
CPC .............. *A61M 1/28* (2013.01); *A61M 39/10* (2013.01); *A61M 39/223* (2013.01); *A61M 1/15* (2022.05);
(Continued)

(58) Field of Classification Search
CPC ........ A61M 1/15; A61M 1/152; A61M 1/156; A61M 1/1565; A61M 1/1566; A61M 1/3622; A61M 1/36226; A61M 1/362265; A61M 1/362266; A61M 1/72; A61M 39/12; A61M 39/165; A61M 2039/1066; A61M 2205/12; A61M 2205/121; A61M 2205/128; A61M 1/1522; A61M 1/155; A61M 1/1561; A61M 1/362223;
(Continued)

(56) References Cited

U.S. PATENT DOCUMENTS 4,173,827 A * 11/1979 Austin, Jr. ........... A61C 1/0038
433/98
4,666,598 A * 5/1987 Heath .................. A61M 1/3621
210/321.72
(Continued)

OTHER PUBLICATIONS

International Search Report mailed Dec. 22, 2021; corresponding International Patent Application No. PCT/US2021/0513075—5 Pages.
(Continued)

*Primary Examiner* — Kami A Bosworth
(74) *Attorney, Agent, or Firm* — K&L Gates LLP

(57) ABSTRACT

An additive manifold includes a valve side including a plurality of valve mounts; and a tube fitting side including a plurality of integrally formed tube fittings. The additive manifold includes at least one passageway formed between the valve side and the tube fitting side, the at least one passageway allowing fluid communication between the valve mounts and the tube fittings.

19 Claims, 14 Drawing Sheets

(51) Int. Cl.
*A61M 39/22* (2006.01)
*A61M 1/14* (2006.01)

(52) U.S. Cl.
CPC ......... *A61M 1/152* (2022.05); *A61M 2207/00* (2013.01)

(58) Field of Classification Search
CPC ...... A61M 1/362261; A61M 2205/122; B67C 3/225; B67C 2007/006; B67D 2210/0006; F17C 2205/0146
See application file for complete search history.

(56) References Cited

U.S. PATENT DOCUMENTS

| | | | |
|---|---|---|---|
| 7,905,853 B2 | 3/2011 | Chapman et al. | |
| 9,808,566 B2* | 11/2017 | Gronau | A61M 1/362265 |
| 2013/0060268 A1* | 3/2013 | Herrig | A61M 60/37 |
| | | | 606/153 |
| 2013/0220907 A1* | 8/2013 | Fulkerson | A61M 1/362227 |
| | | | 210/186 |
| 2015/0224237 A1* | 8/2015 | Reasoner | A61M 1/79 |
| | | | 604/320 |
| 2018/0117288 A1* | 5/2018 | Lindsay | A61M 27/00 |
| 2018/0291933 A1 | 10/2018 | Weickel | |
| 2019/0298231 A1 | 10/2019 | Grant | |

OTHER PUBLICATIONS

Written Opinion mailed Dec. 22, 2021, corresponding International Patent Application No. PCT/US2021/051307—8 Pages.

* cited by examiner

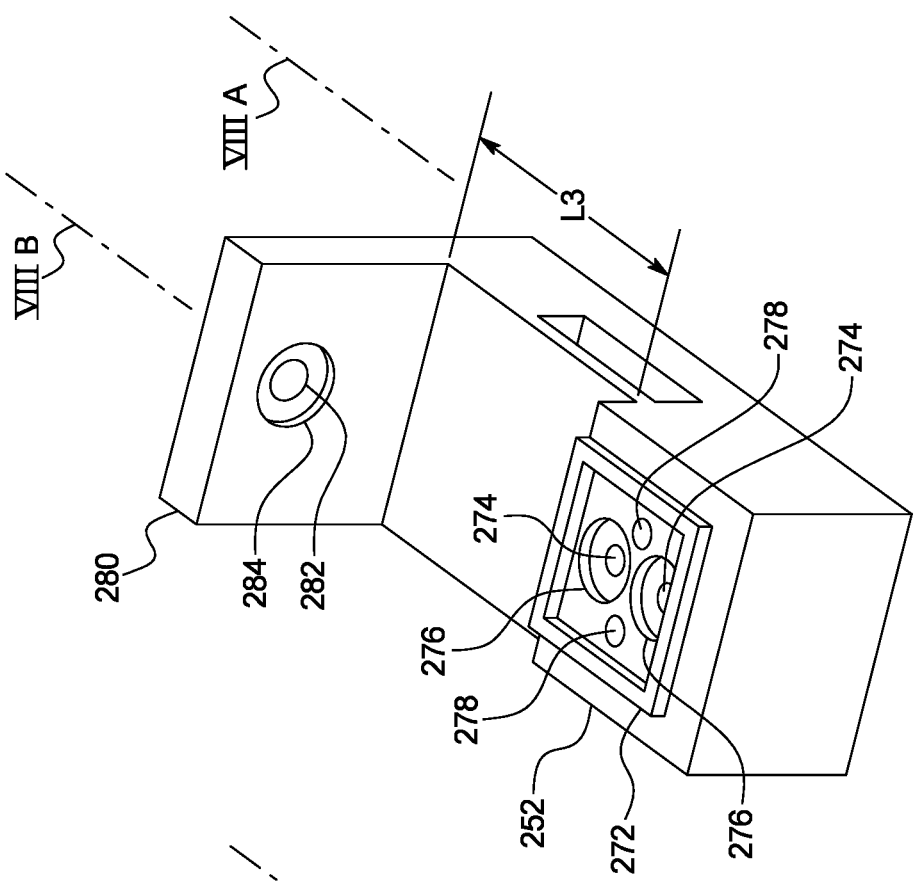
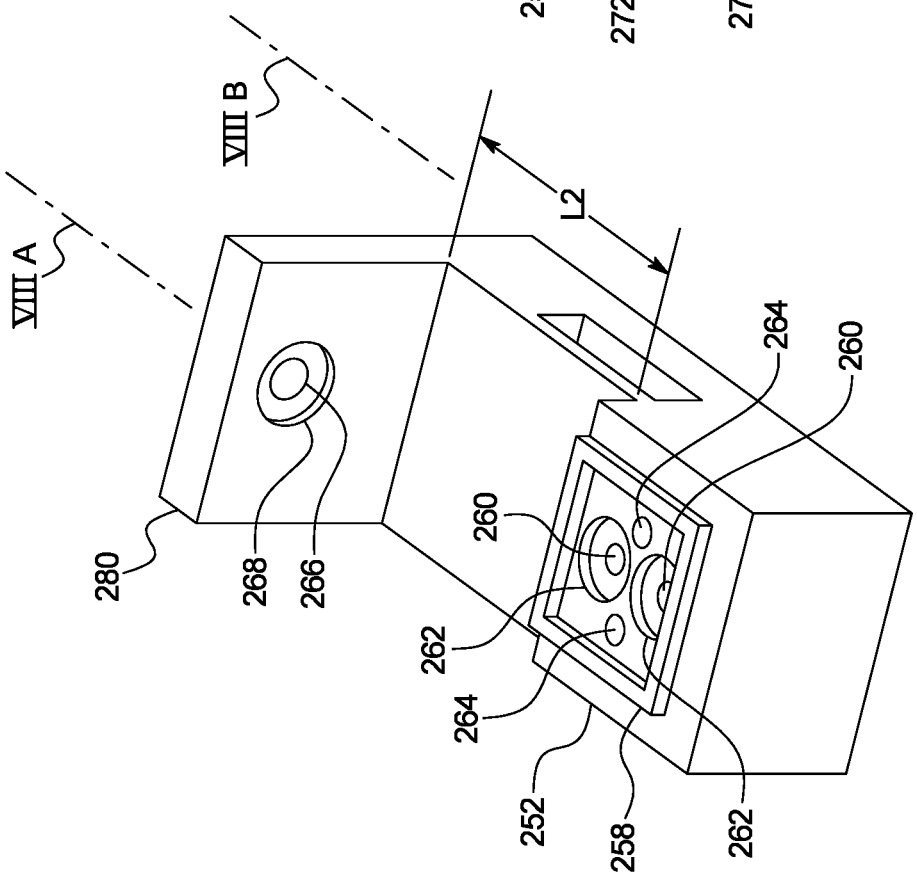

ADDITIVE PNEUMATIC MANIFOLD

PRIORITY CLAIM

This application claims priority to and the benefit as a non-provisional application of U.S. Provisional Patent Application No. 63/094,629, filed Oct. 21, 2020, the entire contents of which are hereby incorporated by reference and relied upon.

BACKGROUND

The present disclosure relates generally to a medical fluid delivery system and in particular to a dialysis system. U.S. Pat. No. 5,350,357, the entire contents of which are incorporated herein by reference, shows a peritoneal dialysis machine 10 having housing 12. Housing 12 holds a bag heater module 14 located under a bag heating plate 16. Housing 12 also encloses a pneumatic actuator module 20. Pneumatic actuator module 20 incorporates a cassette holder 22 that holds a disposable dialysis cassette (not illustrated) and a liquid shutoff assembly 24. Machine housing 12 further encloses a source 30 of pneumatic pressure and an associated pneumatic pressure distribution module 40, which links the pressure source 30 with the actuator module 20. Pressure distribution module 40 stores positive pressure in reservoir 32 and negative pressure in reservoir 34. Machine housing 12 also encloses an AC power supply module 36 and a back-up DC battery power supply module 38 to power machine 10.

Tubing 42 connects pneumatic valves located on pressure distribution module 40 to the machine components that operate using pneumatic pressure. Slots 44 in the side of the pressure distribution module 40 accommodate the passage of the tubing 42. In particular, tubing 42 runs from pressure distribution module 40 to actuator module 20, where the tubing connects to components such as a cassette sealing bladder (not illustrated), an occluder bladder for liquid shutoff assembly 24 and to pump and valve actuators that control the application of positive and negative pressure to different areas of the disposable cassette.

Each of the tubes 42 has to be disconnected individually to remove either pressure distribution module 40 to actuator module 20 from machine 10. Tubes 42 are not easy to disconnect. Tubing 42 often stretches and becomes unusable when pulled off the barbed fittings connected to pressure distribution module 40. The barbed fittings themselves can be damaged if an attempt is made to cut tubes 42 off the fittings.

FIG. 2 shows pressure distribution module 40 exploded. Pressure distribution module 40 includes a printed circuit board 46 which is carried on stand-off pins 48 atop the pressure distribution module. Pressure transducers 50 mounted on printed circuit board 46 of module 40 sense through associated sensing tubes 52 pneumatic pressure conditions present at various points along the air conduction channels (not illustrated) within pressure distribution module 40. Pressure transducers 50 and/or the solder joint that connect the pressure transducers to the printed circuit board 46 can be damaged if an attempt is made to disconnect the tubes between the manifold and the pressure transducers.

Attempts to detach the tubing from actuator module 20 also encounter problems. FIGS. 1 and 3 show a cassette interface 26, which is located inside actuator module 20. T-fittings 28 connect the tubing 42 to the ports of the valve actuators and pump actuators. Thus to remove actuator module 20 from pressure distribution module 40, cassette interface 26 has to be accessed first and then T-fittings 28 have to be removed from cassette interface 26.

U.S. Pat. Nos. 7,905,853, 8,961,444 and 10,471,192 address the problems associated with peritoneal dialysis machine 10 of FIGS. 1 to 3. In particular, FIGS. 4 and 5 illustrate that those patents teach a second prior art pressure manifold assembly 100 having a top plate 102, a bottom valve plate 104 and a gasket 106 sandwiched between top plate 102 and bottom valve plate 104. Top plate 102 can be made of aluminum or other lightweight material that can be threaded or fitted with threaded inserts.

Pressure manifold assembly 100 includes a first port header 108, which is attached to manifold top plate 102 in a sealed manner using o-ring seals 110 and screws 112. O-Ring seals 110 provide a leak tight connection between internal passageways pneumatically connecting first header 108 to manifold top plate 102. A plurality of hose barbs 114 on first header 108 connect the pneumatic passages of first header 108 to the pilot operated valves and pumps contained in actuator assembly (shown above in FIG. 1) using flexible urethane tubing (not shown) for example. The actuator assembly (shown above in FIG. 1) can be separated from manifold assembly 100 by removing screws 112.

Pressure manifold assembly 100 includes a second port header 116, which is also attached to manifold top plate 102 in a sealed manner using o-ring seals 110 and screws 112. O-Ring seals 110 provide a leak tight connection between internal passageways pneumatically connecting second header 116 to manifold top plate 102. A plurality of hose barbs 114 on second header 116 connect the pneumatic passages of second header 116 to pressure transducers contained in a separate printed circuit board assembly, which is similar to item 40 shown in FIG. 2 using flexible urethane tubing (not shown). The pressure transducer printed circuit board 40 can be separated from manifold assembly 100 by removing screws 112.

Port headers 108 and 116 allow manifold assembly 100 to be detached from the dialysis machine, e.g., from a door assembly and electronics in the machine to which the ports and PCB are connected respectively. Other subassemblies, such as a manifold subassembly, a door subassembly and a control board subassembly can be removed and replaced without having to (i) replace any of the interconnecting tubing or (ii) remove any other machine subassembly. The potential to damage any of the interconnecting components is accordingly minimized. For example, tubing does not have to be detached from barbed ports fittings, which otherwise can potentially damage the fitting in addition to destroying the tubing.

FIG. 6 illustrates a third prior art pressure manifold assembly 200. Pressure manifold assembly 200 includes a valve plate 202, a fitting plate 204 and a gasket 206 that seals between valve plate 202 and fitting plate 204. A plurality of fasteners 208 are provided to bolt valve plate 202 and fitting plate 204 together in such a way that gasket 206 is sealed uniformly across the mating plates.

FIG. 6 also illustrates that a plurality of pneumatic tube fittings 210 are provided, which are connected in a fluid-tight manner to fitting plate 204. Pneumatic tubes extend from pneumatic tube fittings 210 and run to various components of the medical or other air-using device.

Pneumatic solenoid valves 212 are mounted to valve plate 202 via valve fasteners 214. Printed circuit boards 216 for electrically controlling pneumatic solenoid valves 212 are located on the valve side of pressure manifold assembly 200.

While prior art pressure manifold assemblies 100 and 200 improve the pneumatic architecture of prior art peritoneal dialysis machine 10, pressure manifold assemblies 100 and 200 as illustrated contain many components. The many components lead to a large amount of assembly steps and a large amount of assembly time. The large amount of assembly septs increases the chance of assembly error. The large amount of assembly time increases cost. A need accordingly exists for a further improved pressure manifold assembly.

SUMMARY

The present disclosure provides an integrated manifold, such as a pneumatic manifold. The manifold is made using an additive manufacturing or three-dimensional ("3D") printing operation. The additive manufactured manifold allows for otherwise assembled components to be built with and as part of the manifold, as opposed to being assembled to the manifold later. One example is an integral pneumatic manifold, which may be additive manufactured with internal pneumatic passageways and tubing fittings on its top side. The tubing fittings are normally provided as separate pieces that have to be assembled in a sealed manner to a separate pneumatic fitting plate. Building the tubing fittings integrally with the pneumatic manifold plate not only allows the number of pieces or parts of an overall assembly to be greatly reduced, including the seals needed to seal the fittings to a pneumatic manifold plate, the integrated fittings also reduce the amount of assembly steps and assembly time. The fittings may also be individually customized to meet a multitude of desired needs as discussed herein.

The additive manifold in one embodiment includes a pneumatic valve side and a tube fitting side. The pneumatic valve side forms the pneumatic apertures and mounting apertures for mounting pneumatic solenoid valves, such as two- and three-way solenoid valves. Other types of valves, such as variable orifice valves may also be connected. The pneumatic apertures may be formed with blind o-ring mounting holes for receiving o-rings around the pneumatic aperture. The mounting apertures may be through-hole apertures, threaded or sized to receive threaded inserts.

The tube fitting side of the additive manifold plate integrally forms tube fittings. The tube fittings may be pointed or oriented in an optimal direction so that when the additive manifold is mounted for operation, pneumatic tubing extends from the fittings in a desired direction. The additive manifold accordingly allows for connecting structures to be optimized, e.g., connected pneumatic tubing lengths.

The tube fittings are formed with hose barbs that have a circular protrusion that expands and press-fits the connected tubing. The tube fittings may be formed with gussets that help to strengthen and add rigidity to the fittings. The tube fittings may also have a shrouded hose barb that sets a minimum bend radius for the pneumatic tubing that extends from the hose barb to prevent the pneumatic tubing from crimping or folding to occlude pneumatic flow. The shroud may also prevent excess forces that could harm or break the hose barb, thereby extending the possibility of optimal additive materials.

The fittings may also be provided with a conical or pyramid-shaped base that adds strength and rigidity alternatively or additionally to the gussets. The bases of different fittings may be sized differently, such that the pneumatic tubing from one fitting extends over an adjacent fitting, further allowing pneumatic tubing runs to be highly organized.

The additive pneumatic manifold also forms internal pneumatic passageways between the pneumatic valve and tube fitting sides to allow for pneumatic communication between the electrically actuated pneumatic solenoid valves and the tube fittings. The internal pneumatic passageways may be formed advantageously having circular, oblong or elliptical cross-sections that allow for smoother air flow versus, e.g., box-shaped passageways. The passageways may communicate with each other and/or with apertures that extend to the valves and/or fittings produced for example by machine milling.

In light of the disclosure set forth herein, and without limiting the disclosure in any way, in a first aspect of the present disclosure, which may be used with any other aspect or portion thereof described herein, an additive manifold includes a valve side including a plurality of valve mounts; and a tube fitting side including a plurality of integrally formed tube fittings.

In a second aspect of the present disclosure, which may be used with any other aspect or portion thereof described herein, the manifold is a single piece manifold.

In a third aspect of the present disclosure, which may be used with any other aspect or portion thereof described herein, the manifold is a pneumatic manifold, and wherein the valve mounts are pneumatic valve mounts.

In a fourth aspect of the present disclosure, which may be used with any other aspect or portion thereof described herein, the pneumatic valve mounts include at least one pneumatic aperture and at least one mounting aperture.

In a fifth aspect of the present disclosure, which may be used with any other aspect or portion thereof described herein, the additive manifold includes an o-ring mounting hole surrounding the at least one mounting aperture.

In a sixth aspect of the present disclosure, which may be used with any other aspect or portion thereof described herein, the valve side includes a raised bar, the raised bar including at least one further pneumatic aperture for cooperation with the at least one aperture.

In a seventh aspect of the present disclosure, which may be used with any other aspect or portion thereof described herein, the additive manifold includes a first row of pneumatic valve mounts adjacent to a first side of the raised bar and a second row of pneumatic valve mounts adjacent to a second side of the raised bar.

In an eighth aspect of the present disclosure, which may be used with any other aspect or portion thereof described herein, different tube fittings of the plurality of fittings are oriented in different directions for optimizing the orientation of mating tubing.

In a ninth aspect of the present disclosure, which may be used with any other aspect or portion thereof described herein, different tube fittings of the plurality of fittings have different heights, allowing pneumatic tubing from a first fitting to extend over an adjacent tube fitting.

In a tenth aspect of the present disclosure, which may be used with any other aspect or portion thereof described herein, at least one of the fittings is formed with a gusset for support.

In an eleventh aspect of the present disclosure, which may be used with any other aspect or portion thereof described herein, the gusset is spaced radially at or approximately at 135° to 150° from a hose barb of the at least one fitting.

In a twelfth aspect of the present disclosure, which may be used with any other aspect or portion thereof described herein, at least one of the fittings is formed with a conical or pyramid shaped base for support.

In a thirteenth aspect of the present disclosure, which may be used with any other aspect or portion thereof described herein, at least one of the fittings is formed with first and second hose barbs for operation with a three-way pneumatic valve.

In a fourteenth aspect of the present disclosure, which may be used with any other aspect or portion thereof described herein, at least one of the fittings is formed with a shrouded hose barb for directing a pneumatic tube exiting the at least one fitting.

In a fifteenth aspect of the present disclosure, which may be used with any other aspect or portion thereof described herein, the shrouded hose barb includes a conically or cylindrically shaped shroud.

In a sixteenth aspect of the present disclosure, which may be used with any other aspect or portion thereof described herein, the additive manifold includes at least one passageway formed between the valve side and the tube fitting side, the at least one passageway allowing fluid communication between the valve mounts and the tube fittings.

In a seventeenth aspect of the present disclosure, which may be used with any other aspect or portion thereof described herein, the at least one passageway is circular, elliptical or oblong in cross-section.

In an eighteenth aspect of the present disclosure, which may be used with any other aspect or portion thereof described herein, the at least one passageway is in fluid communication with another passageway and/or an aperture leading to at least one of the valve mount or the tube fitting.

In a nineteenth aspect of the present disclosure, which may be used with any other aspect or portion thereof described herein, an additive manifold includes a valve side including a plurality of valve mounts; a tube fitting side configured to receive pneumatic tubing; and at least one passageway additively formed between the valve side and the tube fitting side, the at least one passageway allowing fluid communication between the valve mounts and the pneumatic tubing.

In a twentieth aspect of the present disclosure, which may be used with any other aspect or portion thereof described herein, an additive manifold method includes additively forming (i) a valve side of a manifold, the valve side including a plurality of valve mounts, and (ii) a tube fitting side including a plurality of integrally formed tube fittings.

In a twenty-first aspect of the present disclosure, which may be used with any other aspect or portion thereof described herein, additively forming includes vat photopolymerization, material jetting, binder jetting, powder bed infusion, material extrusion, direct energy deposition, or sheet lamination.

In a twenty-second aspect of the present disclosure, any of the features, functionality and alternatives described in connection with any one or more of FIGS. 1 to 18 may be combined with any of the features, functionality and alternatives described in connection with any other of FIGS. 1 to 18.

In light of the present disclosure and the above-listed aspects, it is an advantage of the present disclosure to provide a pneumatic manifold having at least one additive component or part.

It is another advantage of the present disclosure to provide an additive pneumatic manifold having a reduced number of components.

It is a further advantage of the present disclosure to provide an additive pneumatic manifold having a reduced number of assembly steps.

It is yet another advantage of the present disclosure to provide an additive pneumatic manifold having a reduced risk of leakage.

It is yet a further advantage of the present disclosure to provide an additive pneumatic manifold having improved pneumatic passageways and associated air flow.

Yet another advantage of the present disclosure is to provide an additive pneumatic manifold having tube fittings configured to help prevent the kinking or folding of the tubing.

Yet a further advantage of the present disclosure is to provide an additive pneumatic manifold that allows pneumatic tubing runs to be organized and streamlined.

Moreover, it is an advantage of the present disclosure to provide an additive pneumatic manifold having customized tube fittings.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

BRIEF DESCRIPTION OF THE FIGURES

FIG. 8A is a perspective view of a section of a valve side of an additive manifold illustrating one embodiment for a two-way pneumatic valve mounting structure of the present disclosure.

FIG. 8B is a perspective view of a section of a valve side of an additive manifold illustrating one embodiment for a three-way pneumatic valve mounting structure of the present disclosure.

DETAILED DESCRIPTION

Figure 7A:
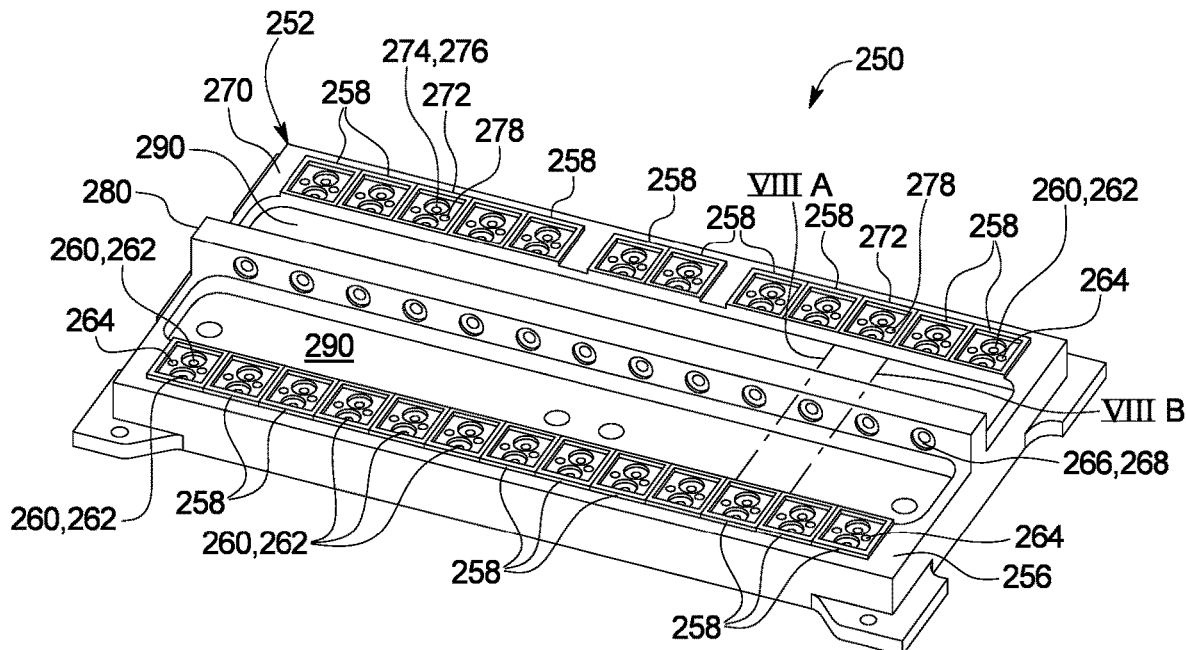
FIG. 7A is a perspective view of a valve side of one embodiment of an additive manifold of the present disclosure.
Figure 7B:
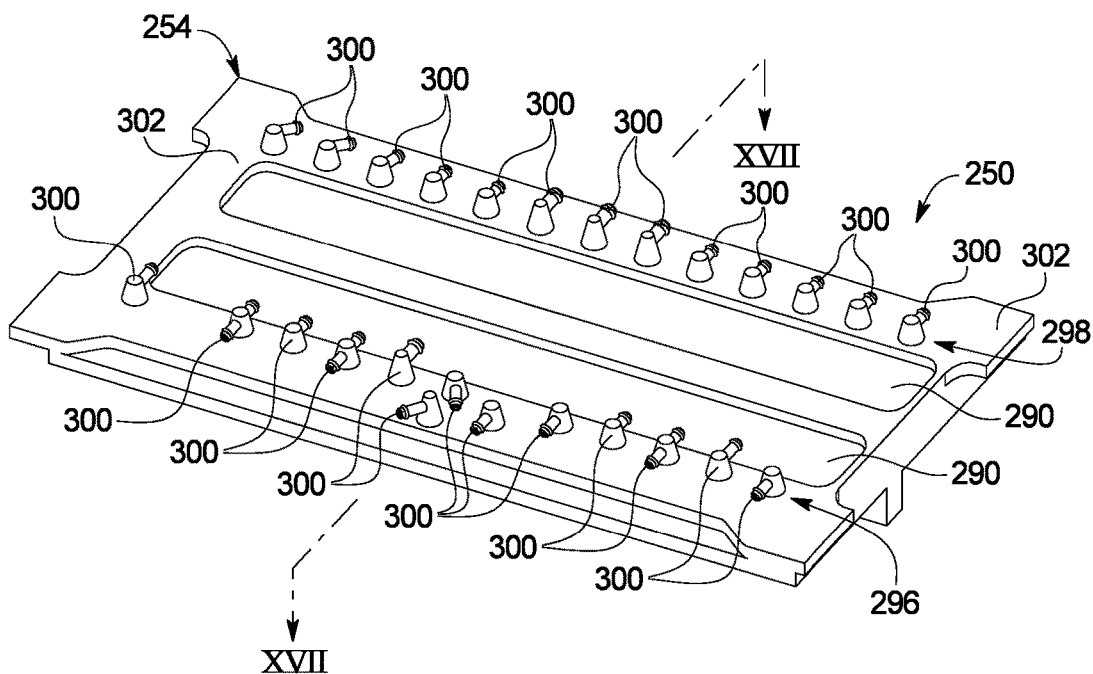
FIG. 7B is a perspective view of a tube fitting side of the additive manifold of FIG. 7A.

Referring now to FIGS. 7A and 7B, one embodiment of an additive pneumatic manifold is illustrated by manifold 250. FIG. 7A illustrates a pneumatic valve side 252 of manifold 250, while FIG. 7B illustrates a fitting side 254 of manifold 250. Manifold 250 is made via additive manufacturing or three-dimensional ("3D") printing, which in general involves the 3D formation of an object for which material is added together, e.g., liquid molecules or powder grains being fused together, typically layer by layer. Suitable materials for additive manifold 250 include polymers, metals and ceramics, including rigid polyurethane ("PU"), polycarbonate ("PC") and acrylonitrile butadiene styrene ("ABS"). The additive or 3D printing process used to form additive manifold 250 may include any one or more of vat photopolymerization, material jetting, binder jetting, powder bed fusion, material extrusion, direct energy deposition, and sheet lamination.

FIG. 7A illustrates that valve side 252 of manifold 250 includes a first strip 256 of two-way or binary on-off pneumatic valve mounts 258 and/or three-way valve mounts 272 (in the illustrated embodiment only two-way mounts 258 are provided for strip 256). Each two-way pneumatic valve mount 258 includes one or more pneumatic aperture 260 and one or more mounting aperture 264. Pneumatic apertures 260 allow pressurized positive or negative air from manifold 250 to flow through the two-way pneumatic valve depending of the electrically controlled switch state of the valve. Each pneumatic aperture 260 in the illustrated embodiment is surrounded by a blind o-ring mounting hole 262. Mounting apertures 264 may include any one or more of through bores, threaded bores, bores sized to receive self-threading fasteners and/or bores sized to receive threaded inserts.

Valve side 252 of manifold 250 also includes a second strip 270 of two-way or binary on-off pneumatic valve mounts 258 and/or three-way valve mounts 272. Each three-way valve mount 272 includes one or more pneumatic aperture 274 and one or more mounting aperture 278. Pneumatic apertures 274 allow pressurized positive or negative air from manifold 250 to flow through the three-way pneumatic valve depending on the electrically controlled switch state of the valve. Each pneumatic aperture 274 in the illustrated embodiment is surrounded by a blind o-ring mounting hole 276. Mounting apertures 278 may likewise include any one or more of through bores, threaded bores, bores sized to receive self-threading fasteners and/or bores sized to receive threaded inserts.

Additive manifold 250 includes a raised bar 280 that extends between the first and second strips 256 and 270 of valve mounts. Raised bar 280 as illustrated in FIG. 7A provides a two-way valve aperture 266, which is surrounded by a blind o-ring mounting hole 268 for each two-way valve mount 258. Thus each two-way pneumatic solenoid valve communicates pneumatically with pneumatic aperture 260 of two-way valve mount 258 and two-way valve aperture 266 formed in raised bar 280. Like three-way valve apertures for each three-way pneumatic solenoid valve (not illustrated for FIG. 7A) are formed on either one or both sides of raised bar 280.

Figure 10:
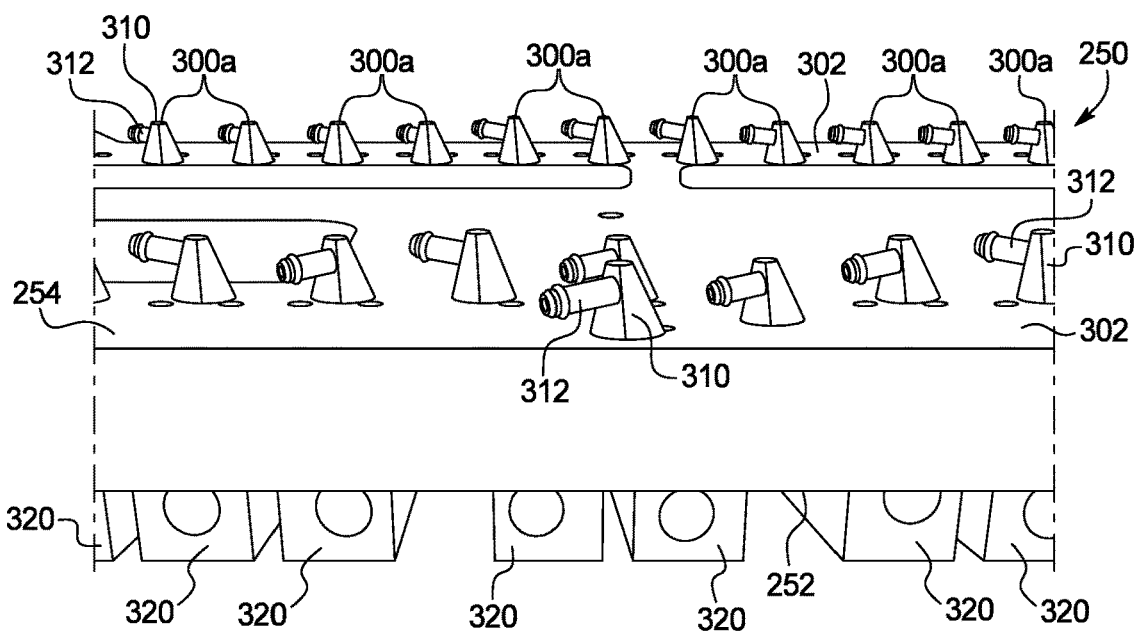
FIG. 10 is a perspective view of a section of an additive manifold of the present disclosure illustrating one embodiment for the tube fittings located on a fitting side of the additive manifold and a plurality of pneumatic solenoid valves mounted to a valve side of the additive manifold.

FIGS. 8A and 8B are sectioned views of valve side 252 of manifold 250 located between lines VIIIA and VIIIB in FIG. 7A. FIG. 8A shows the mounting of two-way pneumatic solenoid valves in more detail, while FIG. 8B shows the mounting of three-way pneumatic solenoid valves in more detail. FIG. 8A in the illustrated embodiment shows two-way or binary pneumatic valve mount 258 including two pneumatic apertures 260, each surrounded by a blind o-ring mounting hole 262. Valve mount 258 also includes two mounting apertures 264. Raised bar 280 provides a two-way valve aperture 266, which is surrounded by a blind o-ring mounting hole 268. Two-way valve aperture 266 cooperates with pneumatic apertures 260 to pneumatically communicate with a two-way or binary pneumatic valve (pneumatic solenoid valves 320 are illustrated in FIG. 10). The length L2 between valve mount 258 and raised bar 280 is the length of the electronically actuated solenoid body of the two-way or binary pneumatic valve in one embodiment.

FIG. 8B in the illustrated embodiment shows a three-way valve mount 272 including two pneumatic apertures 274, each surrounded by a blind o-ring mounting hole 276. Valve mount 272 also includes two mounting apertures 278. Raised bar 280 provides a three-way valve aperture 282, which is surrounded by a blind o-ring mounting hole 284. Three-way valve aperture 282 cooperates with pneumatic apertures 274 to pneumatically communicate with a three-way pneumatic valve. The length L3 between valve mount 272 and raised bar 280 is the length of the electronically actuated solenoid body of the three-way or pneumatic valve in one embodiment.

FIG. 7A further illustrates that wells or openings 290 may be formed on pneumatic valve side 252 of manifold 250. Wells or openings 290 are provided in areas of additive manifold 250 in which the walls surrounding the wells or openings are strong enough to support whatever is mounted to the pneumatic valve side 252 of manifold 250, e.g., the two and three-way pneumatic valves, as well as to support the pneumatic valve side 252 of manifold 250 itself. Wells or openings 290 remove material, lowering cost and weight.

Referring now to FIG. 7B, fitting side 254 of additive manifold 250 in the illustrated embodiment includes a first row 296 of tube fittings 300 (any of fittings 300a to 300e described herein) corresponding to first strip 256 of two-way or binary on-off pneumatic valve mounts 258 (and possibly three-way valve mounts). Fitting side 254 also includes a second row 298 of tube fittings 300 corresponding to second strip 270 of two-way valve mounts and three-way valve mounts 272. Fittings 300 as illustrated below may be different for the two-way versus the three-way pneumatic valves. It should be appreciated however that any of the structure, functionality and alternatives discussed herein for fittings 300 is applicable to both the two-way and three-way pneumatic valves. Fitting side 254 of additive manifold 250 in the illustrated embodiment also includes wells or openings 290 to remove material, lowering cost and weight.

Figure 1:
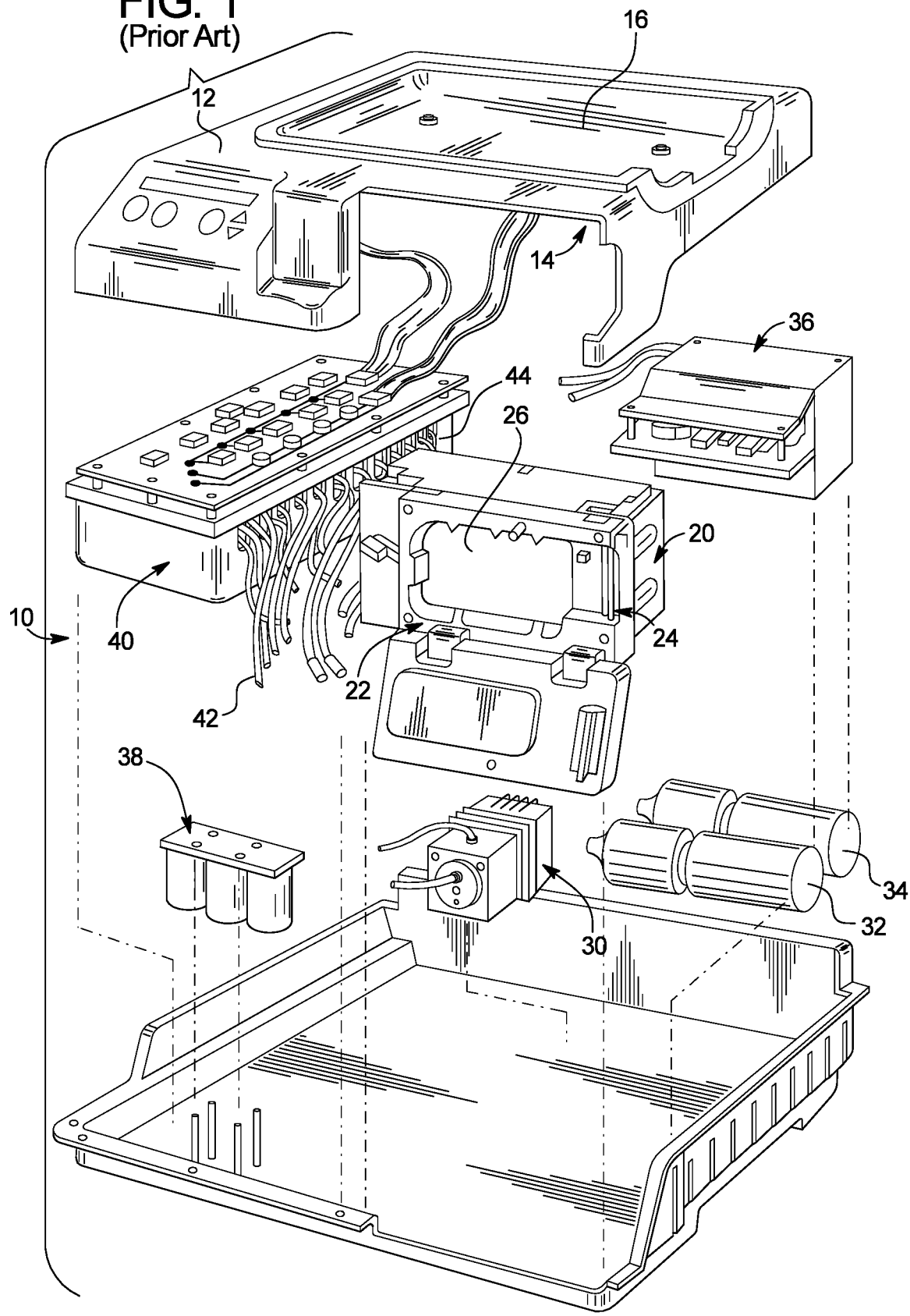
FIGS. 1 to 3 are various perspective views of a first prior art pneumatic system for a peritoneal dialysis machine.
Figure 2:
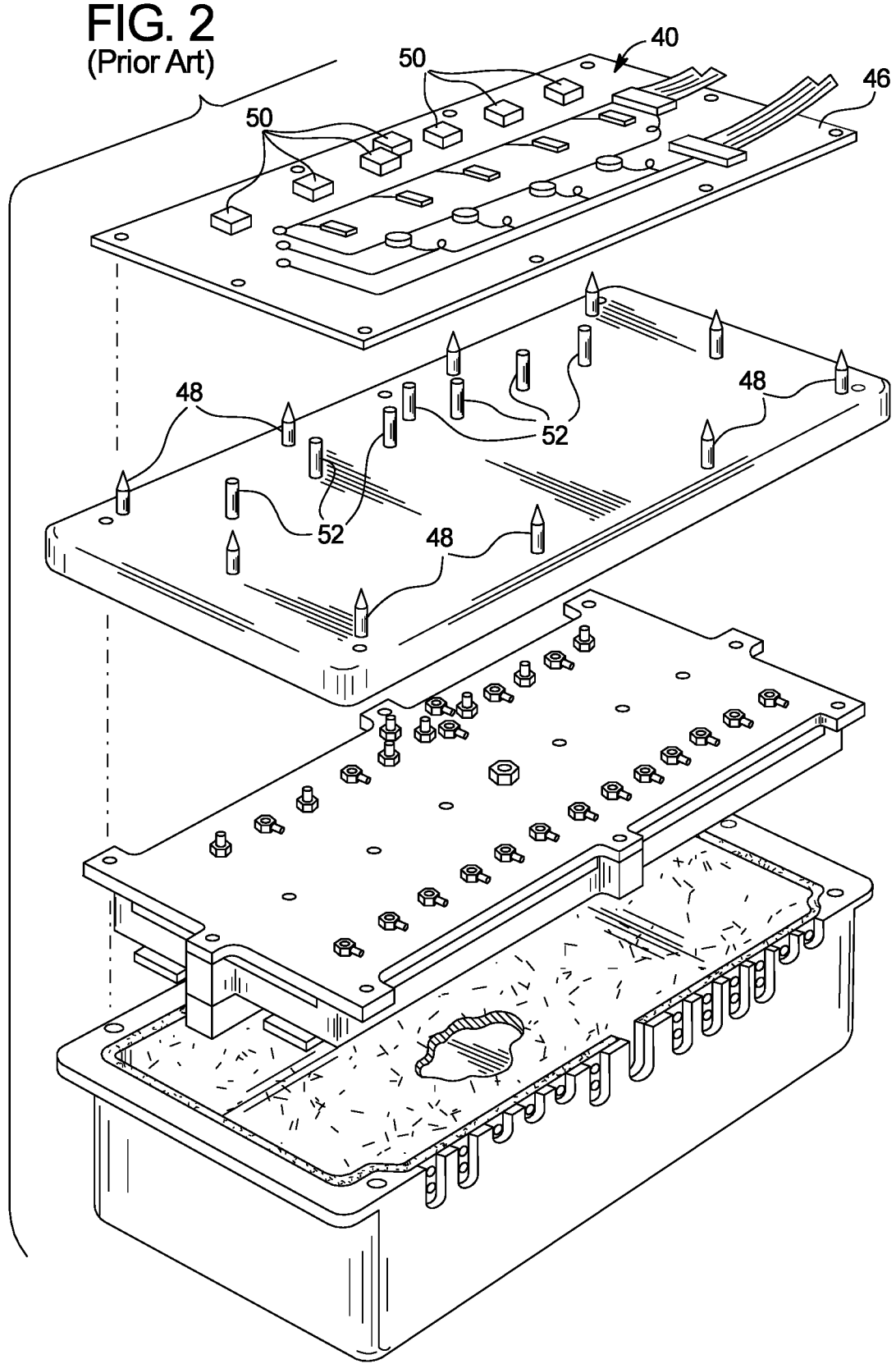
Figure 3:
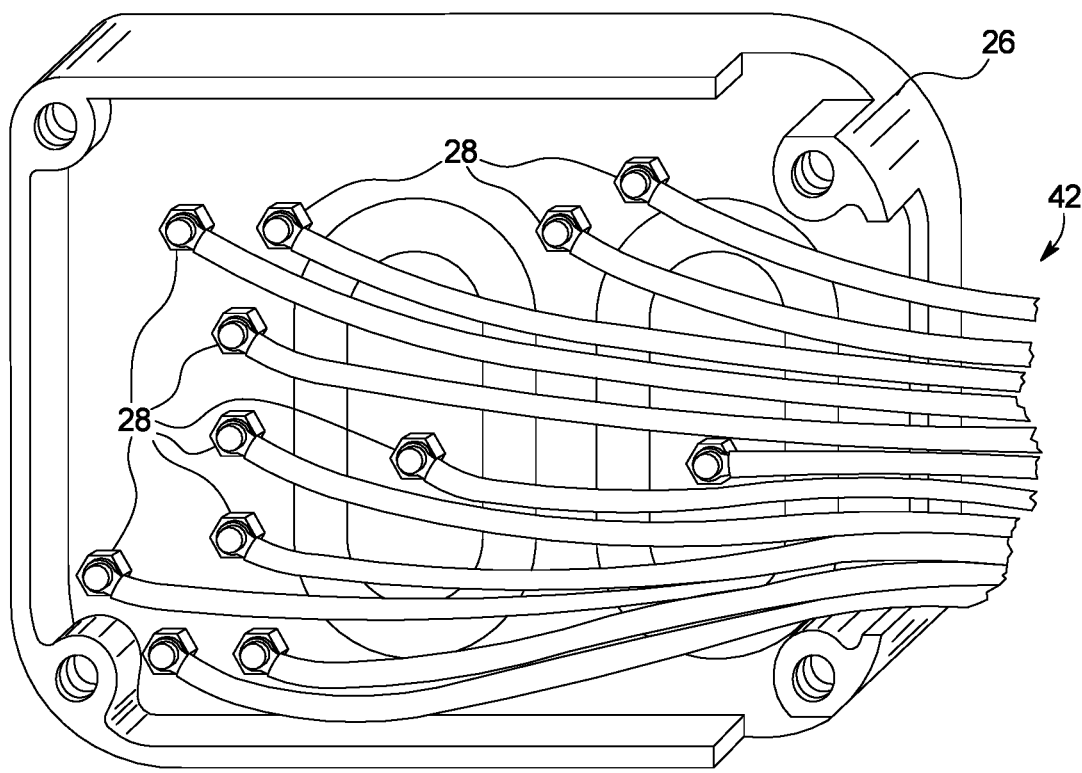
Figure 4:
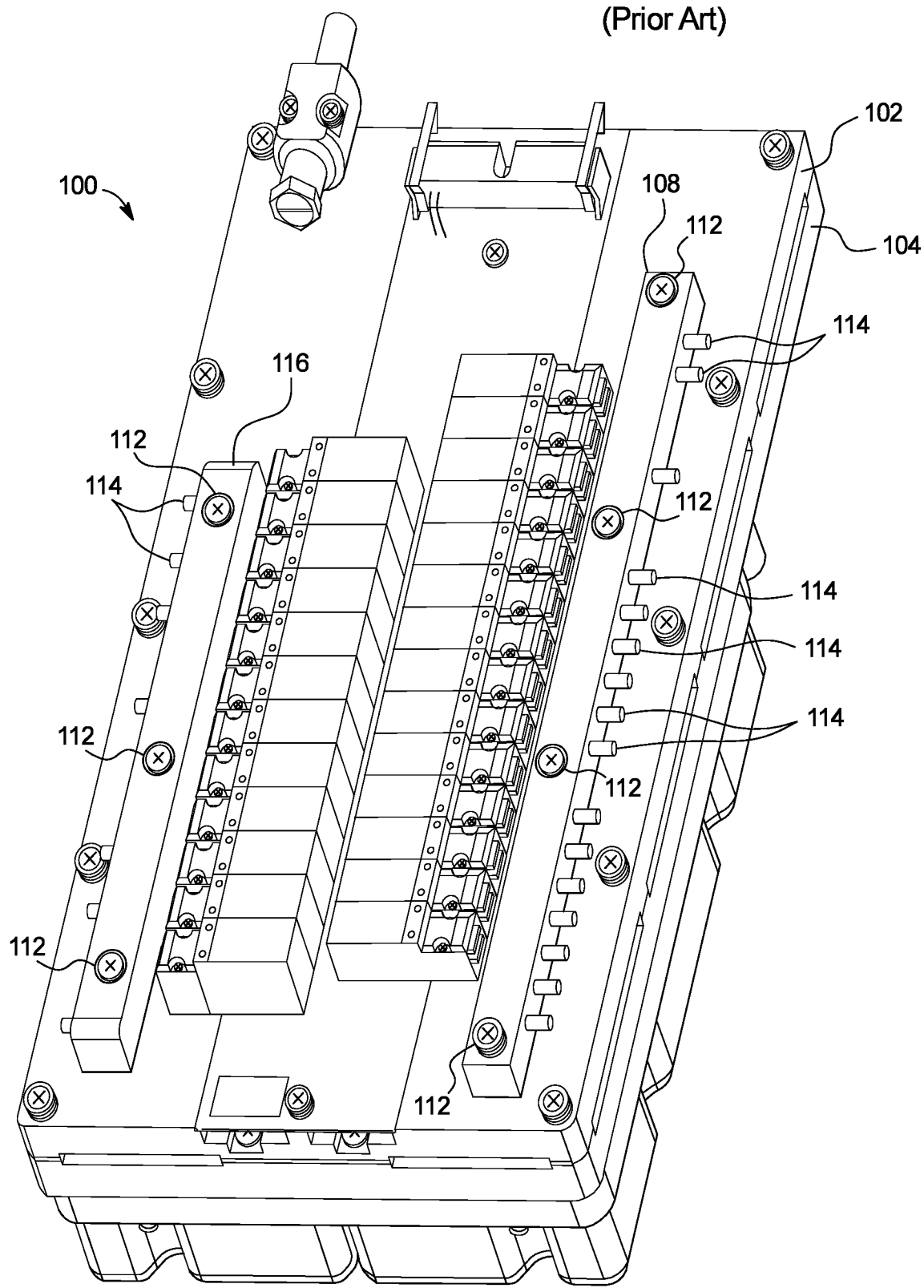
FIG. 4 is a perspective view of a second prior art pressure manifold assembly.
Figure 5:
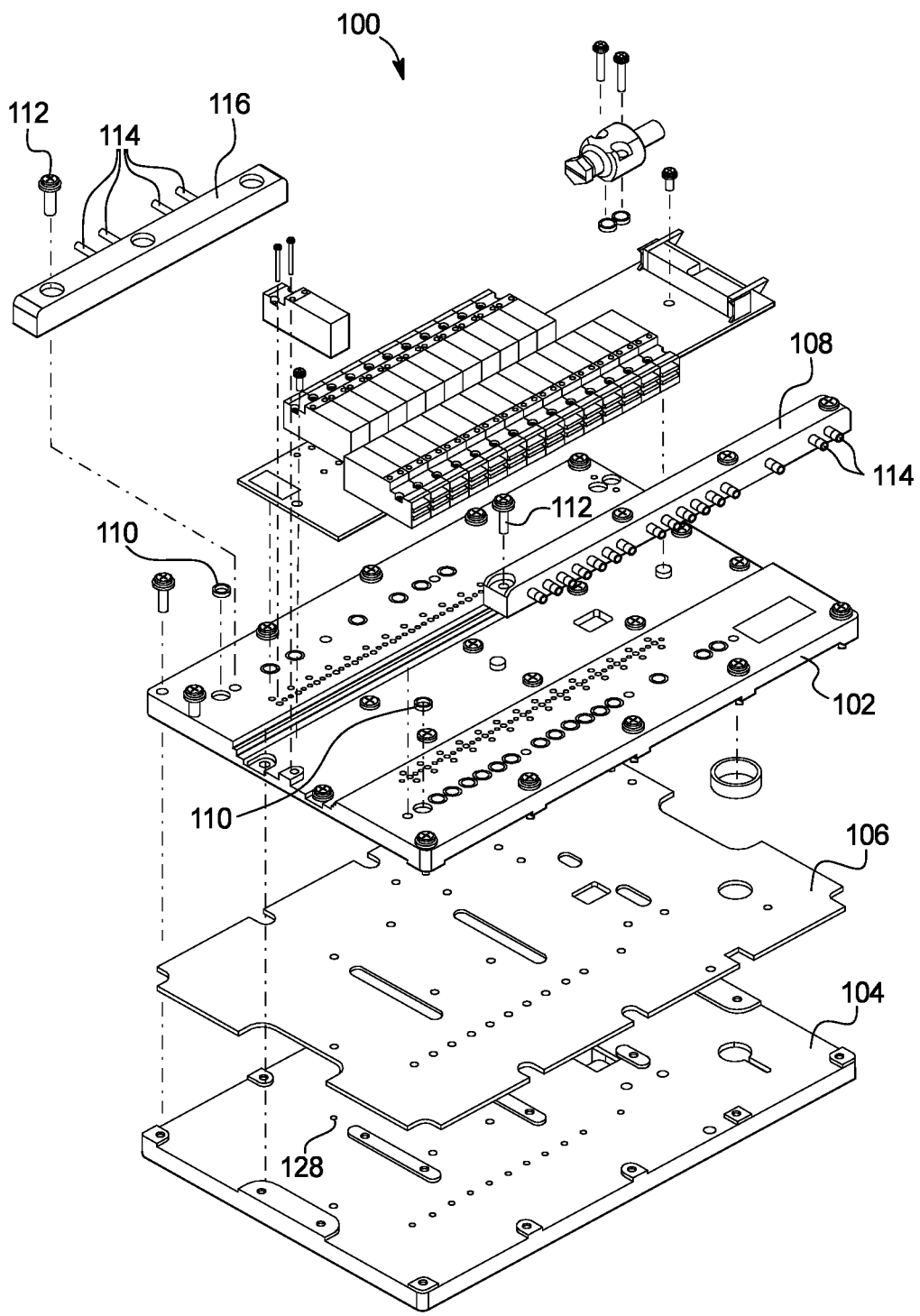
FIG. 5 is an exploded view of the second prior art pressure manifold assembly of FIG. 4.
Figure 6:
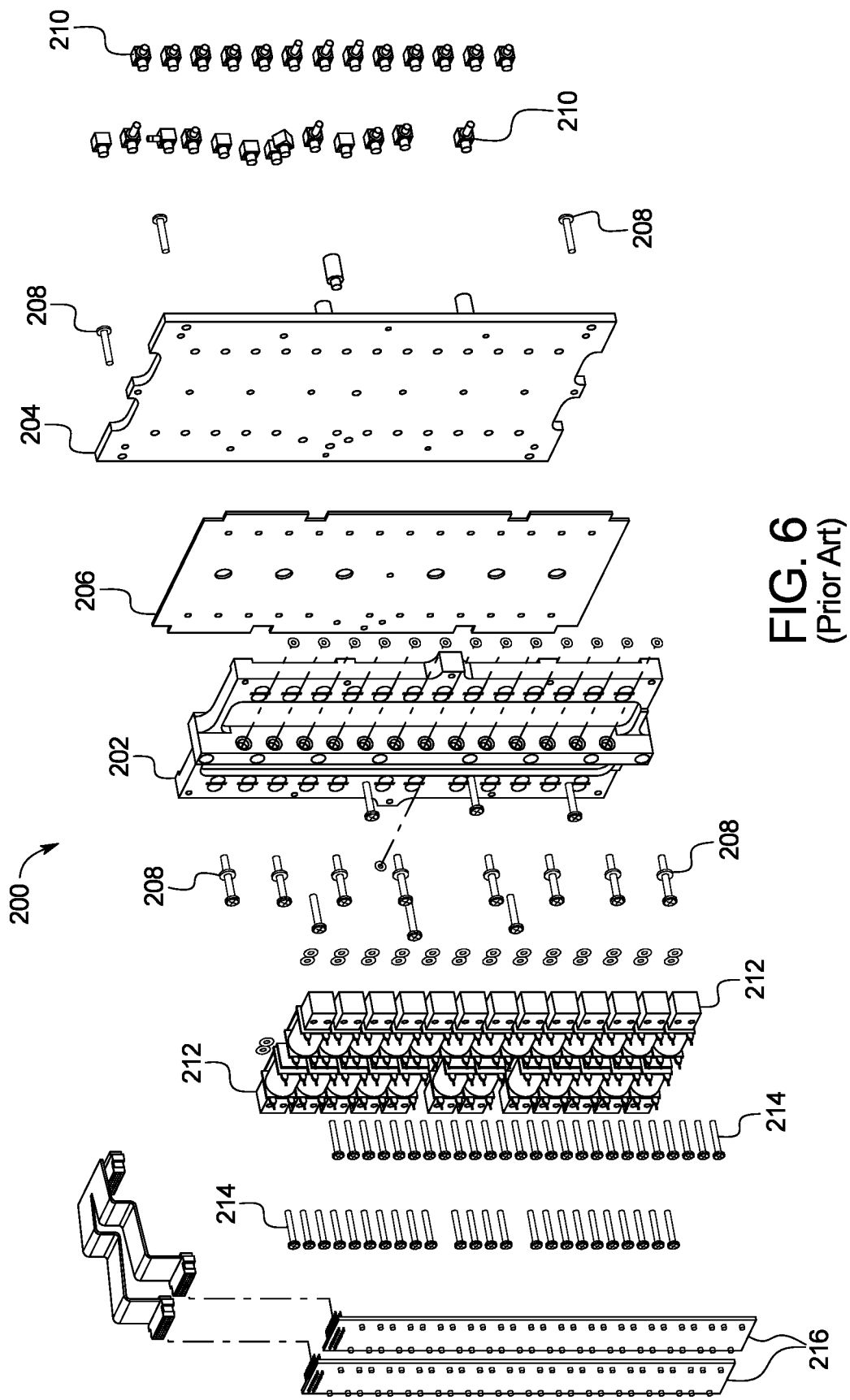
FIG. 6 is an exploded view of a third prior art pressure manifold assembly.

FIG. 7B illustrates that fittings 300 extend from a surface 302 of fitting side 254 of manifold 250 a distance sufficient such that pneumatic tubing may be easily fixed to and removed from the fittings. Importantly, fittings 300 are formed as part of, as an integrated piece with, the rest of manifold 250. In this manner, additive manifold saves many parts, reduces cost significantly, and reduces complexity and labor significantly. Manifold 250 removes the o-rings associated with the fittings, e.g., fittings 210 in FIG. 6, and eliminates associated pneumatic leakage.

Figure 9:
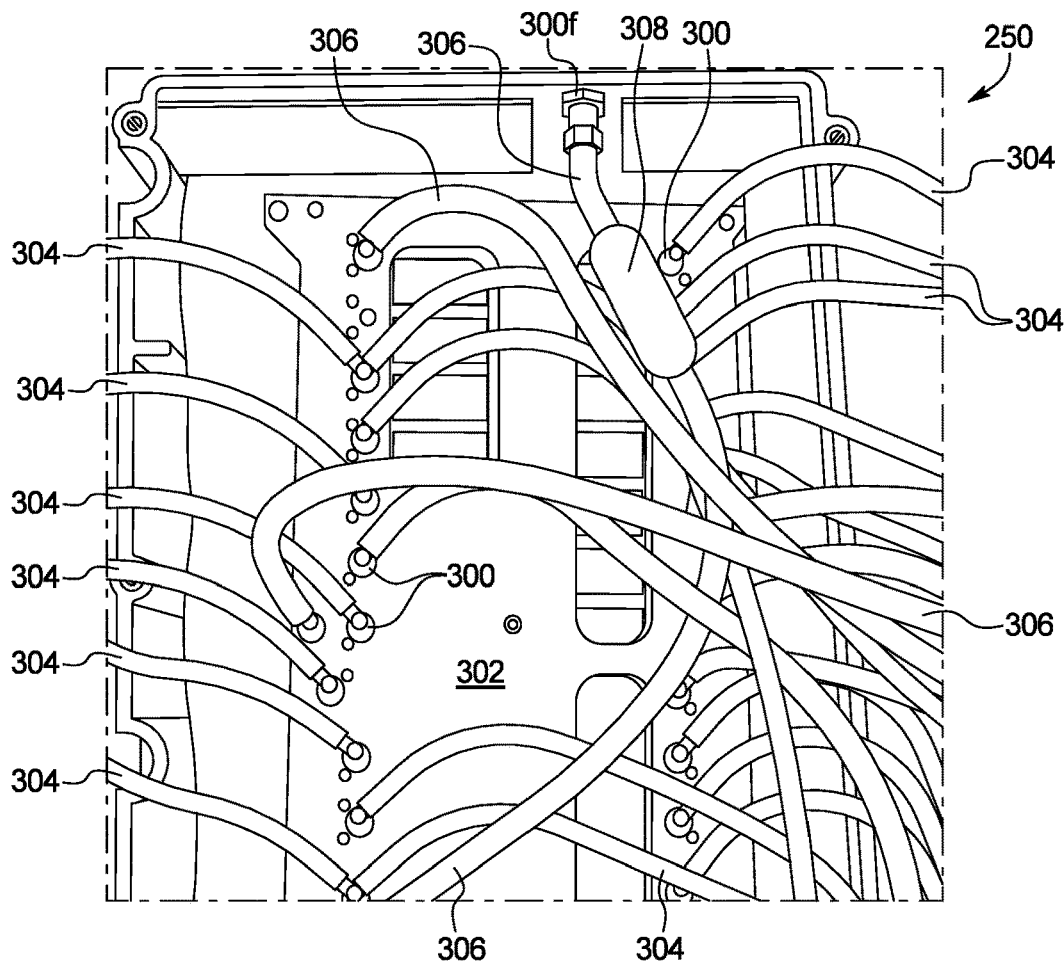
FIG. 9 is a perspective view of a section of a tube fitting side of an additive manifold of the present disclosure illustrating pneumatic tubing connected to the fittings.

Referring now to FIG. 9, pneumatic tubing 304 and 306 is illustrated as being connected sealingly to fittings 300. Fittings 300 are formed to accept pneumatic tubing 304 and 306 of different inside diameters, of different thicknesses, of different colors, of different flexibilities, etc., as needed to deliver different levels of pneumatic pressure to different use points within the medical or other air-using device.

FIG. 9 also illustrates that the tube fittings used with additive manifold 250 do not have to be formed integrally or as part of the rest of the manifold. Here, manifold 250 defines an aperture that accepts a fitting 300f, such as a brass or copper bulkhead fitting, which accepts a pneumatic tube 306 having an air filter 308. The pneumatic tube 306 may be the line that leads from manifold 250 to a source of pneumatic pressure, such as a pneumatic reservoir or pump.

FIG. 10 illustrates tube fittings 300a extending from surface 302 of fitting side 254 of manifold 250. Fittings 300a include a conical base 310 and a hose barb 312 extending from base 310. Conical base 310 provides stability to fitting 300a and is shape well suited to additive formation or 3D printing due to its decreasing diameter extending from base 310. Hose barbs 312 as illustrated are formed so as to extend advantageously in a desired direction, e.g., in a direction pointing to a tubing destination.

FIG. 10 also illustrates pneumatic solenoid valves 320 mounted to pneumatic valve side 252 of additive manifold 250. Pneumatic solenoid valves 320 communicate pneumatically with tube fittings 300a via pneumatic passageways formed within additive manifold 250 as discussed in detail below. Pneumatic solenoid valves 320 may be two-way or three-way valves as discussed herein. Pneumatic solenoid valves 320 are electrically actuated in one embodiment and are powered via one or more printed circuit board ("PCB") mounted to additive manifold 250 and placed in electrical communication with valves 320.

Figure 11:
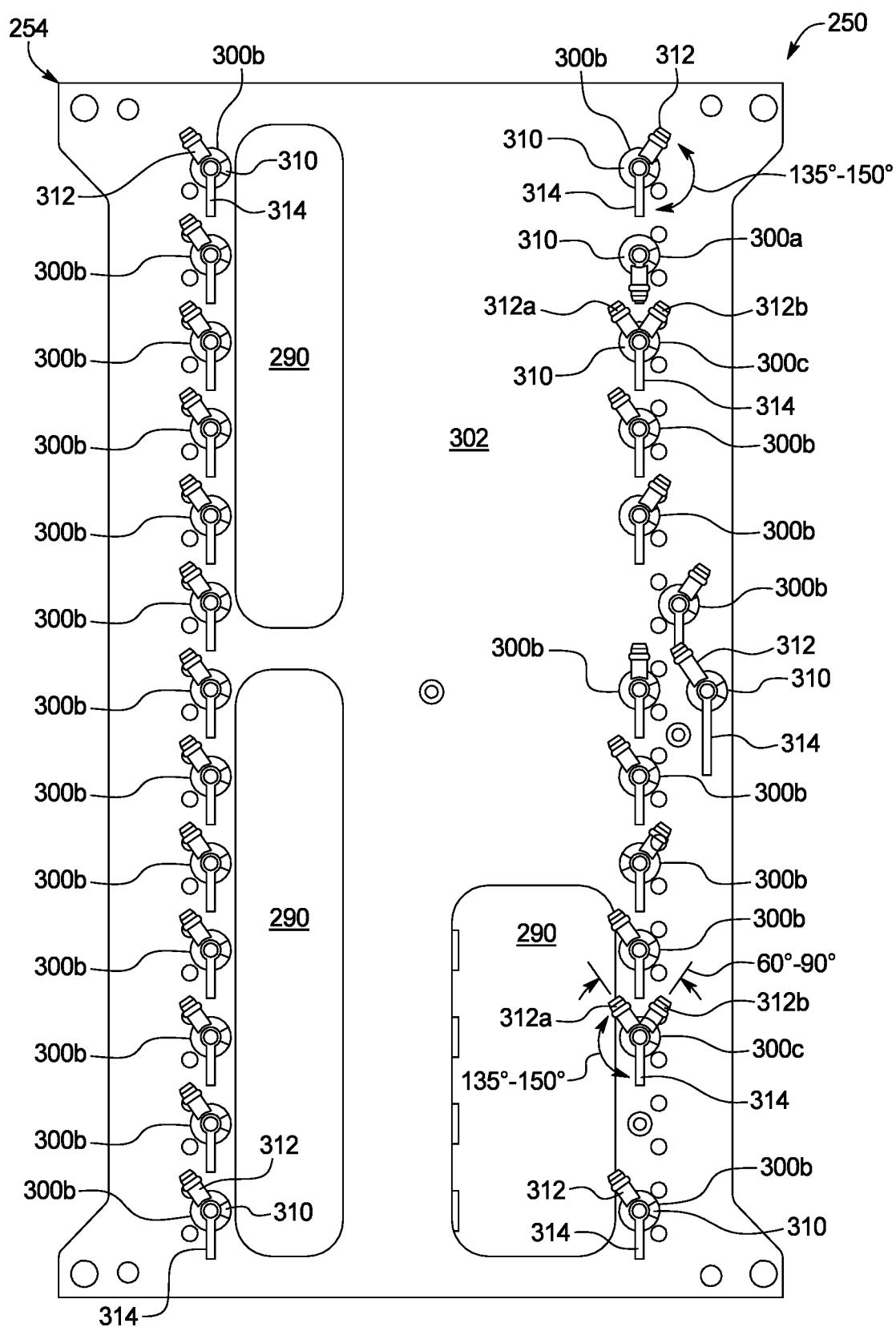
FIG. 11 is a top plan view of one embodiment of a fitting side of the additive manifold of the present disclosure illustrating various embodiments for the tube fittings of the present disclosure.

FIG. 11 illustrates surface 302 of fitting side 254 of manifold 250 having alternative tube fittings 300b. Alternative fittings 300b include a base 310, such as a conical base and a hose barb 312 extending from the base. Alternative fittings 300b are also formed additively to have a gusset 314. Gussets 314 may extend in a same direction, as illustrated, and may be spaced any radial distance from their respective hose barbs 312. In the illustrated embodiment, gussets 314 are spaced radially at or approximately at 135° to 150° from hose barbs 312. Gussets 314 provide additional rigidity to fittings 300b and are likewise well suited for additive formation due to their generally triangular shape. Alternative, e.g., angled, shapes could also provide benefit for additive formation. In FIG. 11, fittings 300b are provided to operate with two-way pneumatic valves fixed to two-way valve mounts 258.

FIG. 11 also illustrates alternative tube fittings 300c, which include first and second hose barbs 312a and 312b. Fittings 300c are provided to operate with three-way pneumatic valves fixed to three-way valve mounts 272. Hose barbs 312a and 312b may be the same or be formed differently from one another. Hose barbs 312a and 312b may each be spaced radially at or approximately at 135° to 150° from gussets 314. Hose barbs 312a and 312b may also be spaced radially at or approximately at 60° to 90° from each other. Fittings 300c may also have a conical base 310.

FIG. 11 further illustrates that wells or openings 290 may alternatively or additionally extend all the way through additive manifold 250 to remove even more material and expense, while still maintaining rigidity and strength. For example, a portion of opening 290 may be blind and only extend through a portion of manifold 250, while another portion of opening 290 extends all the way through the manifold. In a further alternative embodiment, the entirety of openings 290 are apertures extending all the way through manifold 250.

FIG. 11 further illustrates that other fittings, e.g., fitting 300a, may be provided (any combination of fittings 300a to 300f may be provided). In the illustrated embodiment, base 310 of fitting 300a is taller than base 310 of adjacent fitting 300c, so that hose barb 312 of fitting 300a clears three-way valve fitting 300c. The clearance allows for more efficient pneumatic tubing runs.

Figure 12:
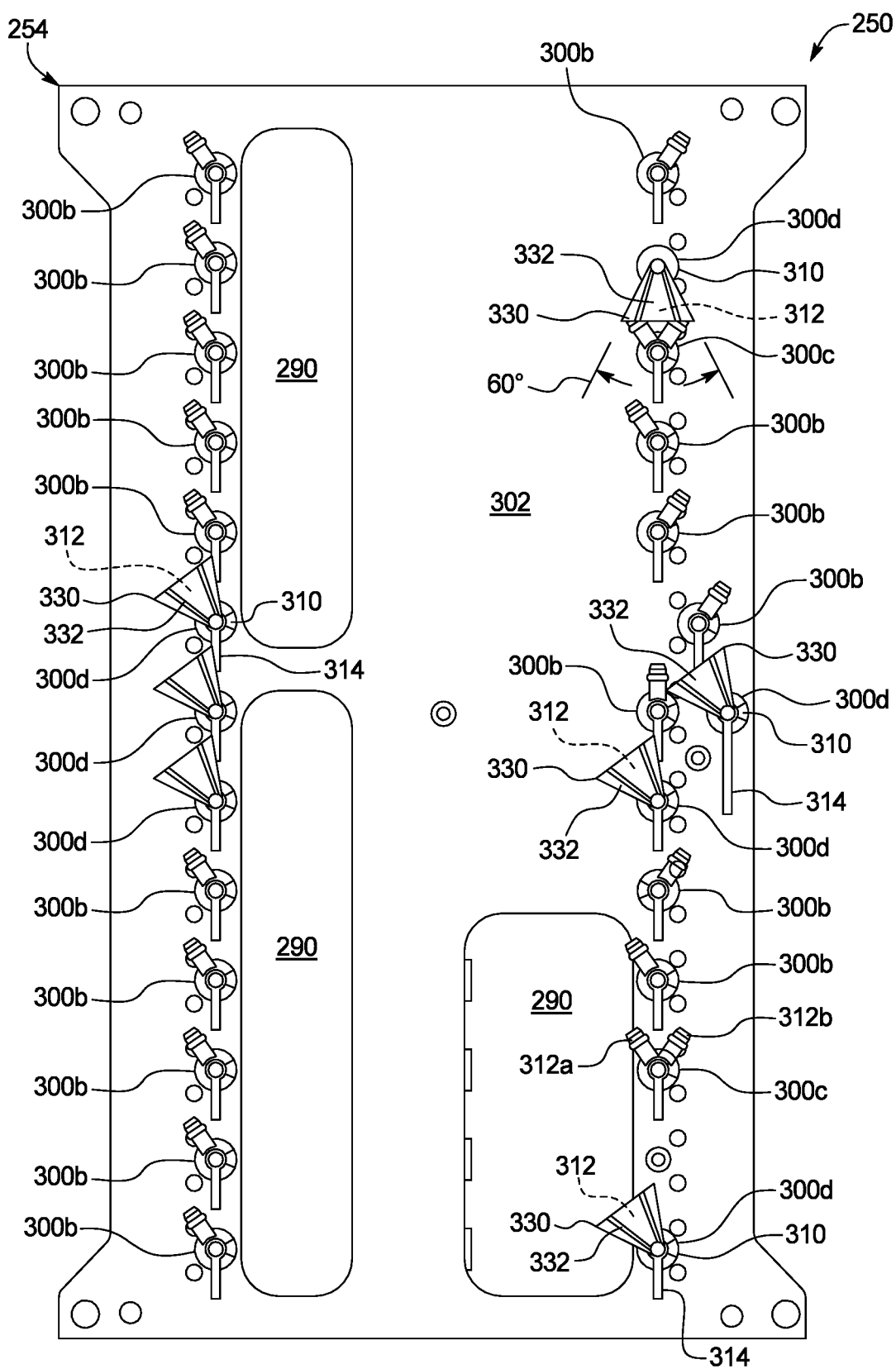
FIG. 12 is a top plan view of a second embodiment of a fitting side of the additive manifold of the present disclosure illustrating additional embodiments for the tube fittings of the present disclosure.

FIG. 12 illustrates surface 302 of fitting side 254 of manifold 250 having tube fittings 300b (two-way) and tube fittings 300c (three-way), including all of the structure, functionality and alternatives described above for those fittings in connection with FIG. 11. FIG. 12 illustrates that manifold 250 includes further alternative tube fittings 300d. Fittings 300d may include a conical base 310 and/or a gusset 314. Fitting 300d further includes a shrouded hose barb 330. Shrouded hose barb 330 includes hose barb 312 as illustrated above, which is surrounded by a shroud or cone 332. Shroud or cone 332 is formed integrally with shrouded hose barb 330 and the remainder of additive manifold 250. Shroud or cone 332 prevents pneumatic tubing 304 and 306 that has to make a large bend (e.g., 135° or more) from kinking or folding. Shroud or cone 332 sets a minimum bend radius for the pneumatic tubing 304 and 306 that has to make the large bend. Shroud or cone 332 may be formed to have any desired conical angle, e.g., less than 90°, such as 60°.

As illustrated in FIG. 12, shroud or cone 332 of one fitting 300d may overlap or cover a portion of a gusset 314 from another fitting. FIG. 12 also illustrates that fitting 300d in the upper-right corner of manifold 250 includes a base 310 that has been extended so that shroud or cone 332 resides above hose barbs 312a and 312b of an adjacent three-way valve fitting 300c.

Figure 13:
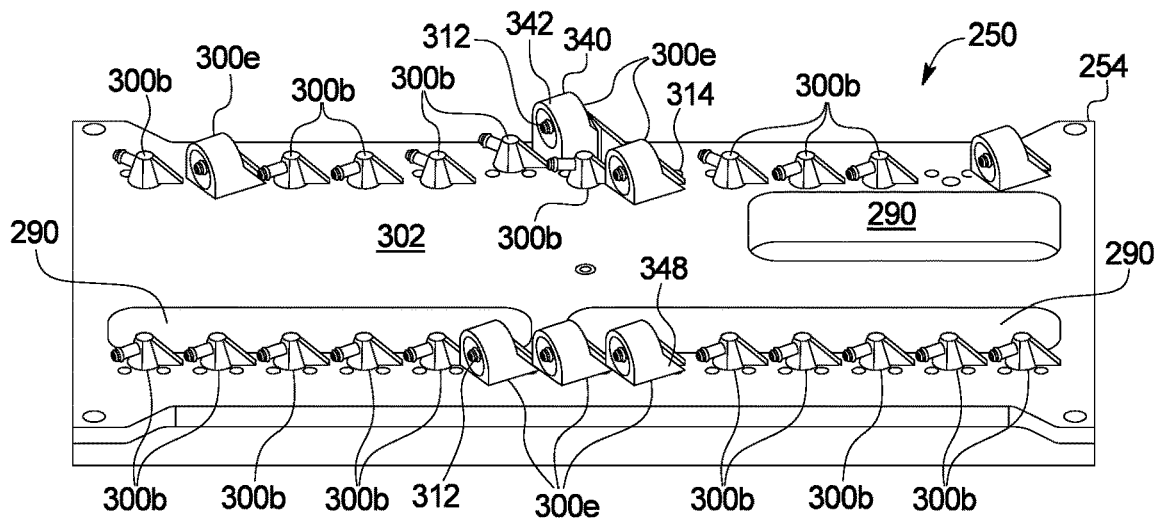
FIG. 13 is a top plan view of a third embodiment of a fitting side of the additive manifold of the present disclosure illustrating further additional embodiments for the tube fittings of the present disclosure.

FIG. 13 illustrates surface 302 of fitting side 254 of manifold 250 having tube fittings 300b (two-way) and possibly tube fittings 300c (three-way, not illustrated in FIG. 12), including all of the structure, functionality and alternatives described above for those fittings in connection with FIG. 11. FIG. 13 illustrates that manifold 250 includes further alternative tube fittings 300e. Fittings 300e may include a conical base 310 and/or a gusset 314. Fittings 300e also includes a shrouded hose barb 340. Shrouded hose barb 340 includes hose barb 312 as illustrated above, which is surrounded by a shroud or cylinder 342. Shroud or cylinder 342 is formed integrally with shrouded hose barb 340 and the remainder of additive manifold 250. Shroud or cylinder 342, like shroud 332, prevents pneumatic tubing 304 and 306 that has to make a large bend (e.g., 135° or more) from kinking or folding. Shroud or cylinder 342 sets a minimum bend radius for the pneumatic tubing 304 and 306 that has to make the large bend. Shroud or cylinder 342 may be formed to have any desired diameter or radius, e.g., to be two to five times larger than the nominal diameter of hose barb 312.

Figure 14:
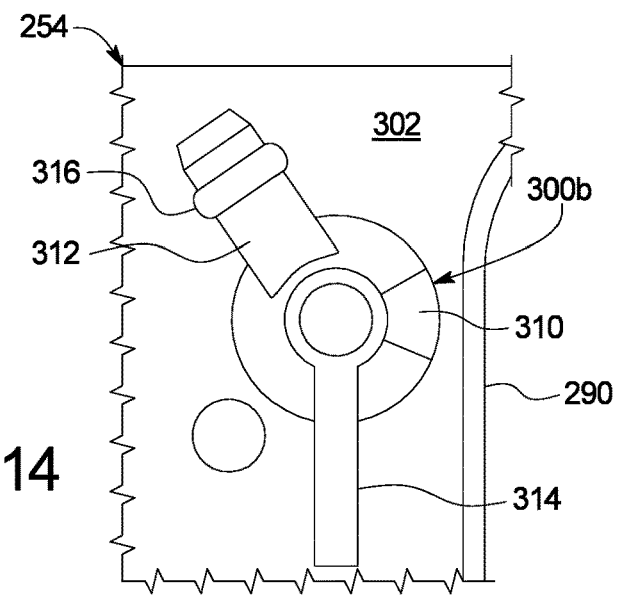
FIG. 14 is top plan section of a fitting side of the additive manifold of the present disclosure illustrating one embodiment of a tube fitting in detail.
Figure 15:
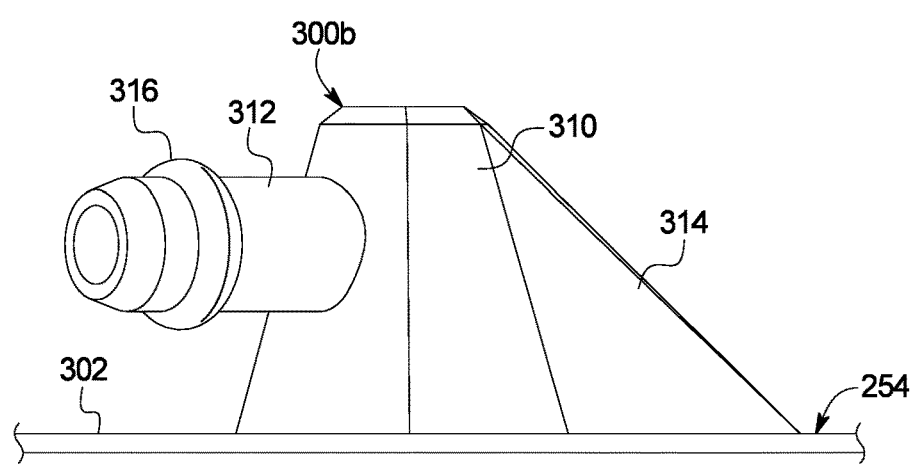
FIG. 15 is an isometric view of the tube fitting of FIG. 14.

FIGS. 14 and 15 illustrate tube fitting 300*b* in more detail, however, each of the features illustrated and described for fitting 300*b* in connection with FIGS. 14 and 15 is equally applicable to three-way fitting 300*c*, shrouded fitting 300*d* and shrouded fitting 300*e*. FIGS. 14 and 15 illustrate that hose barb 312 includes a circular protrusion 316, which stretches the diameter of the mating end of pneumatic tubing 304 or 306 as it is press-fitted over hose barb 312. Circular protrusion 316 helps to ensure an airtight seal between tubing 304 or 306 and hose barb 312. Circular protrusion 316 also helps to maintain a press-fit relationship so that tubing 304 or 306 does not inadvertently come loose from hose barb 312.

It should be appreciated that while FIGS. 14 and 15 illustrate base 310 as being conical in one embodiment, in other embodiments, base 310 has flat surfaces and/or corners, e.g., is pyramid shaped. Gusset 314 is illustrated in FIGS. 14 and 15 as extending from the top of base 310 to surface 302. Gusset 314 alternatively extends from a middle portion of base 310 to surface 302. Gusset 314 may have a straight slope as illustrated or a curved slope, e.g., convex or concave.

Figure 16:
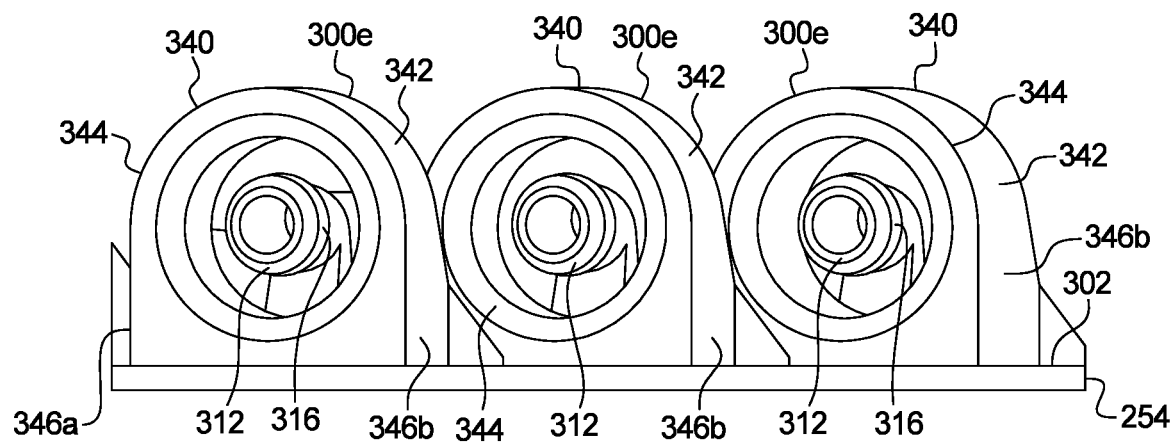
FIG. 16 is an isometric view of another embodiment for a tube fitting of the present disclosure.

FIG. 16 illustrates shrouded tube fitting 300*e* in more detail and shows three adjacent shrouded fittings 300*e*. Hose barb 312 is illustrated having circular protrusion 316. Shroud or cylinder 342 of shrouded hose barb 340 is illustrated having a circular portion 344 that transitions into two vertical legs 346*a* and 346*b* that extend to surface 302. Shroud or cylinder 342 accordingly forms a U-shape in the illustrated embodiment. Circular portion 344 as illustrated completes a full circle in addition to transitioning into vertical legs 346*a* and 346*b*.

Legs 346*a* and 346*b* may be formed having gussets 348 (see FIG. 13), e.g., extending in the opposite direction as hose barb 312, for additional strength and rigidity. FIG. 13 also illustrates that legs 346*a* and 346*b* and base 310 for different fittings 300*e* may have different heights as needed to run pneumatic tubing 304 and 306 in an organized manner.

Shroud or cylinder 342 may be separate from base 310 or be contiguous with the base. Shroud or cylinder 342 may also (i) extend the same horizontal distance as hose barb 312, (ii) extend further horizontally than hose barb 312, or (iii) allow hose barb 312 to protrude horizontally from within shroud or cylinder 342.

Figure 17:
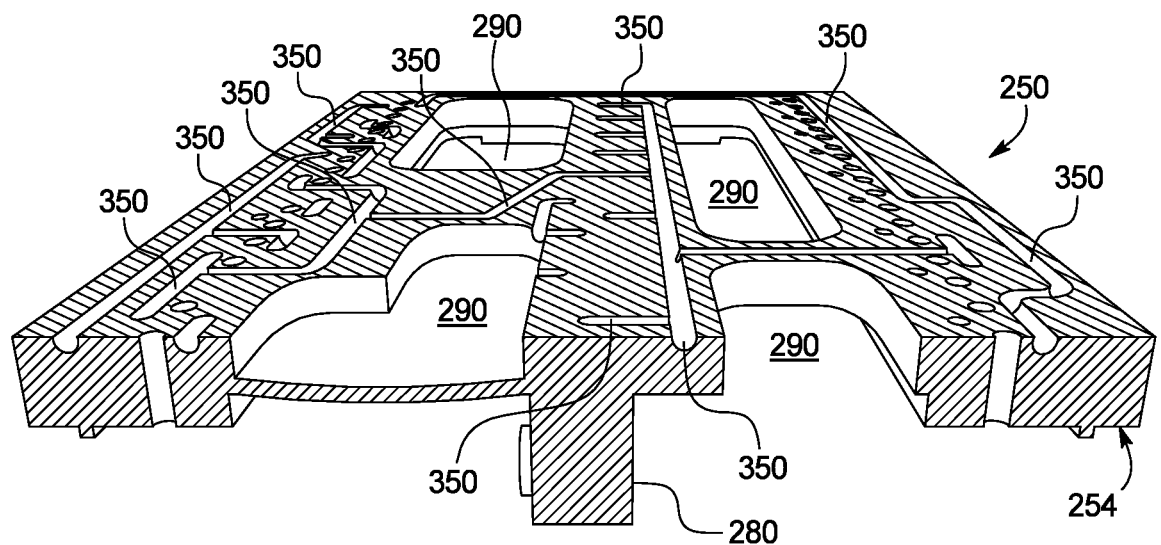
FIG. 17 is a perspective view of the additive manifold of the present disclosure, which has been sectioned twice to illustrate various embodiments for the pneumatic passageways of the manifold.
Figure 18:
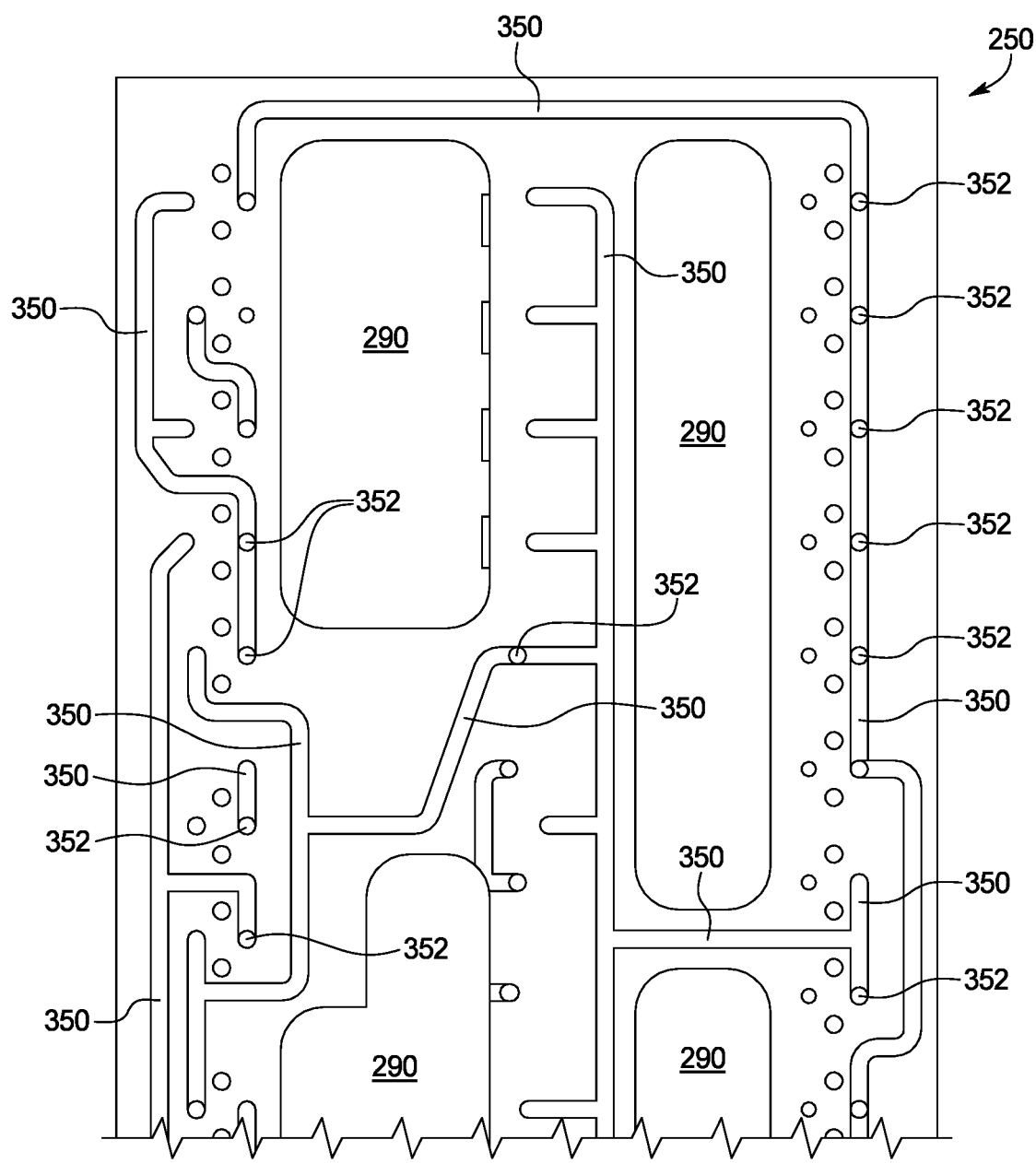
FIG. 18 is a top plan view of a portion of the section of the additive manifold illustrated in FIG. 17.

FIGS. 17 and 18 illustrate a section of additive manifold taken through line XVII-XVII of FIG. 7B to illustrate multiple pneumatic passageways 350 formed within the interior of additive manifold 250 to transfer pneumatic pressure between pneumatic solenoid valves 320 and tube fittings 300*a* to 300*e* (referred to collectively herein as tube fittings 300 or generally individually as tube fitting 300). Passageways 350 in the illustrated embodiment are circular in cross-section. Passageways 350 may alternatively be elliptical or oblong in cross-section. While passageways 350 may alternatively be formed with straight sides, circular or curved sides are advantageous because they produce a smoother air flow. Passageways 350 are advantageously formed without having to seal two plates together via an intervening gasket.

FIGS. 17 and 18 illustrate that pneumatic passageways 350 communicate fluidly with one another. Pneumatic passageways 350 also communicate fluidly with apertures 352, which lead, for example, to pneumatic solenoid valves 320 and/or to tube fittings 300. Pneumatic passageways 350 may also communicate fluidly with covered wells or openings 290, e.g., to form one or more storage area for positive and/or negative pressure.

It should be understood that various changes and modifications to the presently preferred embodiments described herein will be apparent to those skilled in the art. For example, while the present disclosure has been described primarily in connection with peritoneal dialysis, the principles discussed herein apply to any medical field. In another example, while the shrouded hose barbs have been described in connection with a fitting having a single hose barb, the associated shrouds may also be provided with multiple, e.g., three-way valve hose barbs. Additionally, while the present disclosure has been described primarily in connection with pneumatic systems, the principles discussed herein apply to other types of actuation, such as hydraulic or electromechanical. Such changes and modifications can be made without departing from the spirit and scope of the present subject matter and without diminishing its intended advantages. It is therefore intended that such changes and modifications be covered by the appended claims.

The invention is claimed as follows:

1. An additive manifold comprising:
a valve side including a plurality of valve mounts; and
a tube fitting side including a plurality of integrally formed tube fittings, wherein each of the tube fittings includes a base and a hose barb, wherein each hose barb extends from a respective one of the bases such that each hose barb is relatively perpendicular to the respective base, wherein each hose barb is integrally formed with the respective base, the hose barbs being arranged in non-uniform, non-parallel directions, and each of the hose barbs includes a circular protrusion configured to form an airtight seal when coupled with tubing,
wherein each base has a first flow path,
wherein each hose barb has a second flow path, and
wherein the first flow path connects to the second flow path at a perpendicular angle.

2. The additive manifold of claim 1, wherein the manifold is a single piece manifold.

3. The additive manifold of claim 1, wherein the manifold is a pneumatic manifold, and wherein the valve mounts are pneumatic valve mounts.

4. The additive manifold of claim 3, wherein the pneumatic valve mounts include at least one pneumatic aperture and at least one mounting aperture.

5. The additive manifold of claim 4, wherein the pneumatic valve mounts include an o-ring mounting hole surrounding the at least one mounting aperture.

6. The additive manifold of claim 3, wherein the valve side includes a raised bar, the raised bar including at least one pneumatic aperture for cooperation with at least one aperture.

7. The additive manifold of claim 6, which includes a first row of the pneumatic valve mounts adjacent to a first side of the raised bar and a second row of the pneumatic valve mounts adjacent to a second side of the raised bar.

8. The additive manifold of claim 1, wherein different tube fittings of the plurality of tube fittings are oriented in different directions for optimizing orientation of mating tubing.

9. The additive manifold of claim 1, wherein different tube fittings of the plurality of tube fittings have different heights allowing pneumatic tubing from a first of the tube fittings to extend over an adjacent one of the tube fittings.

10. The additive manifold of claim 1, wherein at least one of the tube fittings is formed with a gusset for support.

11. The additive manifold of claim 10, wherein the gusset is spaced radially at or approximately at 135° to 150° from the hose barb of the at least one tube fitting.

12. The additive manifold of claim 1, wherein at least one of the bases has a conical or pyramid shape for support.

13. The additive manifold of claim 1, wherein at least one of the tube fittings is formed with a second hose barb for operation with a three-way pneumatic valve.

14. The additive manifold of claim 1, wherein the hose barb of at least one of the tube fittings is a shrouded hose barb for directing a pneumatic tube exiting the at least one tube fitting.

15. The additive manifold of claim 14, wherein the shrouded hose barb includes a conically or cylindrically shaped shroud.

16. The additive manifold of claim 1, wherein the manifold includes at least one passageway formed between the valve side and the tube fitting side, the at least one passageway allowing fluid communication between the valve mounts and the tube fittings.

17. The additive manifold of claim 16, wherein the at least one passageway is circular, elliptical or oblong in cross-section.

18. The additive manifold of claim 16, wherein the at least one passageway is in fluid communication with another passageway and/or an aperture leading to at least one of the valve mounts or at least one of the tube fittings.

19. An additive manifold comprising:
a valve side including a plurality of valve mounts;
a tube fitting side configured to receive pneumatic tubing and including a plurality of integrally formed tube fittings, wherein each of the tube fittings includes a base and a hose barb, wherein each hose barb extends from a respective one of the bases such that each hose barb is relatively perpendicular to the respective base, wherein each hose barb is integrally formed with the respective base, the hose barbs being arranged in non-uniform, non-parallel directions and each of the hose barbs includes a circular protrusion configured to form an airtight seal when coupled with tubing; and
at least one passageway additively formed between the valve side and the tube fitting side, the at least one passageway allowing fluid communication between the valve mounts and the pneumatic tubing;
wherein each base has a first flow path;
wherein each hose barb has a second flow path; and
wherein the first flow path connects to the second flow path at a perpendicular angle.

* * * * *